(12) United States Patent
Williams

(10) Patent No.: US 12,064,060 B2
(45) Date of Patent: Aug. 20, 2024

(54) CORN DOG MOLD DEVICE

(71) Applicant: Simeaco Williams, Starkville, MS (US)

(72) Inventor: Simeaco Williams, Starkville, MS (US)

( * ) Notice: Subject to any disclaimer, the term of this patent is extended or adjusted under 35 U.S.C. 154(b) by 43 days.

(21) Appl. No.: 17/740,401

(22) Filed: May 10, 2022

(65) Prior Publication Data
US 2022/0354309 A1  Nov. 10, 2022

Related U.S. Application Data

(60) Provisional application No. 63/186,449, filed on May 10, 2021.

(51) Int. Cl.
*A47J 43/20* (2006.01)
*A23L 5/10* (2016.01)
*A23P 20/10* (2016.01)
*A23P 30/10* (2016.01)

(52) U.S. Cl.
CPC .............. *A47J 43/20* (2013.01); *A23L 5/11* (2016.08); *A23P 20/10* (2016.08); *A23P 30/10* (2016.08)

(58) Field of Classification Search
CPC .... A47J 43/20; A23P 30/10; B29C 45/14819; B29C 70/70; A23G 9/503; A23G 9/221; A23G 9/288; A23G 9/283
USPC .......... 99/441, 440, 439, 428, 425; 425/441, 425/443, 451.9, 233, 234, 235, 116, 425/126.2, 318; 249/120, 122, 154, 156, 249/160, 163, 164
See application file for complete search history.

(56) References Cited

U.S. PATENT DOCUMENTS

| | | | | |
|---|---|---|---|---|
| 1,875,660 A | * | 9/1932 | Rodin | A61C 13/16 425/178 |
| 2,282,500 A | * | 5/1942 | Sohn | A47J 37/0611 99/381 |
| 4,626,185 A | * | 12/1986 | Monnet | B29C 45/14065 425/117 |
| 4,790,740 A | * | 12/1988 | Pearlman | A47J 29/00 425/441 |
| 4,812,323 A | * | 3/1989 | Savage | A21D 13/33 426/549 |
| 5,208,043 A | * | 5/1993 | Gatarz | B29C 33/0044 425/117 |
| 5,324,186 A | * | 6/1994 | Bakanowski | A61C 13/20 425/DIG. 11 |
| 5,671,658 A | * | 9/1997 | Macasaet | A47J 37/0611 99/380 |
| 5,738,895 A | * | 4/1998 | Fuchs | A23G 9/083 425/126.2 |

(Continued)

*Primary Examiner* — Reginald Alexander
(74) *Attorney, Agent, or Firm* — Brennan, Manna & Diamond, LLC

(57) ABSTRACT

The invention relates to a corn dog mold device comprised of an upper half and a lower half that attach to one another in a snap-like fashion via a plurality of protrusions. The upper half has a convex area and the lower half has a concave area that receive the upper and lower portions of a corn dog, and wherein each half has a semi-circular opening that allows the stem of a corndog to extend outwards from the halves. To use the device, a corn dog can be battered and both halves can be secured to each other with the battered corn dog within the device. The device can be placed within a freezer for 3 to 5 minutes to allow the shape of the battered corn dog to settle before cooking, wherein after 3 to 5 minutes the corn dog can be removed from the device and then fried.

9 Claims, 3 Drawing Sheets

(56) References Cited

U.S. PATENT DOCUMENTS

2018/0289211 A1\* 10/2018 Daniels .................. A21D 13/47

\* cited by examiner

CORN DOG MOLD DEVICE

CROSS-REFERENCE TO RELATED APPLICATION

The present application claims priority to, and the benefit of, U.S. Provisional Application No. 63/186,449 which was filed on May 10, 2021 and is incorporated herein by reference in its entirety.

FIELD OF THE INVENTION

The present invention relates generally to the field of corn dogs. More specifically, the present invention relates to a corn dog mold device comprised of an upper half and a lower half that attach to one another in a snap-like fashion via a plurality of protrusions. The upper half has a convex area and the lower half has a concave area that respectively receive the upper and lower portions of a corn dog, and wherein each half has a semi-circular opening that allows the stem of a corndog to extend outwards from the halves. To use the device, a corn dog can be battered, wherein both halves can be secured to each other with the battered corn dog within the device. The device can be placed within a freezer for 3 to 5 minutes to allow the shape of the battered corn dog to settle before cooking, wherein after 3 to 5 minutes the corn dog can be removed from the device and then fried. Accordingly, the present disclosure makes specific reference thereto. Nonetheless, it is to be appreciated that aspects of the present invention are also equally applicable to other like applications, devices and methods of manufacture.

BACKGROUND

Traditionally, a corn dog is comprised of a hot dog or sausage on a stick that has been coated in a cornmeal batter that is then deep fried. Because of the battering process, making corn dogs can be an extremely messy and time-consuming affair. Dipping corn dogs in batter can further result in batter being spilled onto nearby surfaces, which is undesirable as the surfaces then must be cleaned. Batter also often gets on the hands and clothing of the individual making the corn dogs. Both scenarios are undesirable as they have the potential to be extremely messy and difficult to clean. As a result, many individuals who love corn dogs may be discouraged from making them themselves due to the potential for a serious mess.

Therefore, there exists a long-felt need in the art for a device that allows a user to make a corn dog in an easy and convenient manner. There also exists a long-felt need in the art for a corn dog mold device that allows a user to make a corn dog without the traditional mess associated with making a corn dog that is caused by the batter of the corn dog spilling onto nearby surfaces and the user. Further, there exists a long-felt need in the art for a corn dog mold device that is reusable, easy to clean, simple to use and easy to manufacture.

The subject matter disclosed and claimed herein, in one embodiment thereof, comprises a corn dog mold device. The device is comprised of an upper half and a lower half that attach to one another in a snap-like fashion via a plurality of protrusions. The upper half has a convex area and the lower half has a concave area that respectively receive the upper and lower portions of a corn dog, and wherein each half has a semi-circular opening that allows the stem of a corndog to extend outwards from the halves. To use the device, a corn dog can be battered, wherein both halves can be secured to each other with the battered corn dog within the device. The device can be placed within a freezer for 3 to 5 minutes to allow the shape of the battered corn dog to settle before cooking, wherein after 3 to 5 minutes the corn dog can be removed from the device and then fried.

In this manner, the corn dog mold device of the present invention accomplishes all of the forgoing objectives and provides a corn dog mold device that allows a user to make a corn dog in an easy and convenient manner without the traditional mess associated with making a corn dog that is caused by the batter of the corn dog spilling onto nearby surfaces and the user. Further, the device is reusable, easy to clean, simple to use and easy to manufacture which makes the device extremely attractive to users. In this manner, the corn dog mold device overcomes the limitations of existing methods of making corn dogs known in the art.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a corn dog mold device. The device is comprised of a body with an upper half and lower half that enclose a corn dog. In the preferred embodiment the body is manufactured from a food grade silicone-type rubber material that may be flexible, semi-rigid or rigid. However, the body may also be manufactured from a flexible, semi-rigid or rigid plastic. Any surface of the body may have a plurality of indicia such as, but not limited to, patterns, logos, emblems, images, symbols, designs, letters, words, characters, animals, advertisements, brands, etc., and may also be any color known in the art.

The upper half of the body has a generally convex area on the top surface of the upper half, wherein the upper half receives the upper portion of a corn dog. The bottom surface of the upper half further has a plurality of generally triangular or generally cylindrical convex protrusions. The protrusions extend from the bottom surface and through and above the top surface of the upper half. In addition, the bottom surface of said half is further comprised of a generally rectangular channel and a semi-circular opening.

The lower half of the body has a generally concave area that extends inward from the top surface of the lower half towards the bottom surface of the lower half. Said area receives the lower portion of a corn dog. The top surface of the lower half further has a plurality of generally triangular or generally cylindrical convex protrusions that extend from the top surface of the lower half. Said protrusions are received by the protrusions of the upper half, such that the lower half can be secured to the upper half in a removable snap fashion after a corn dog has been inserted into both halves.

In various embodiments, the bottom surface of the upper half and top surface of the lower half may be comprised of at least one fastener that allows each half to attach to one another. The bottom surface of the upper half and the top surface of the lower half may further be comprised of a rubber gasket that prevents corn dog batter from leaking out of the sides of each half after each half has been attached to one another.

A method of using the device to prepare a corn dog first involves battering a corn dog, which can occur with the corn dog outside of the device or with the corn dog resting in one half of the device. Then, both halves can be secured to each other with the battered corn dog within the device. Next, the device can be placed within a freezer for 3 to 5 minutes to allow the shape of the battered corn dog to settle before cooking. After 3-5 minutes, the corn dog can be removed from the device and then fried. Then, the device can be cleaned using warm water and soap and can be reused as necessary.

Accordingly, the corn dog mold device of the present invention is particularly advantageous as it allows a user to make a corn dog in an easy and convenient manner without the traditional mess associated with making a corn dog. Further, the device is reusable, easy to clean, simple to use and easy to manufacture. In this manner, the corn dog mold device overcomes the limitations of existing methods of making corn dogs known in the art.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1:
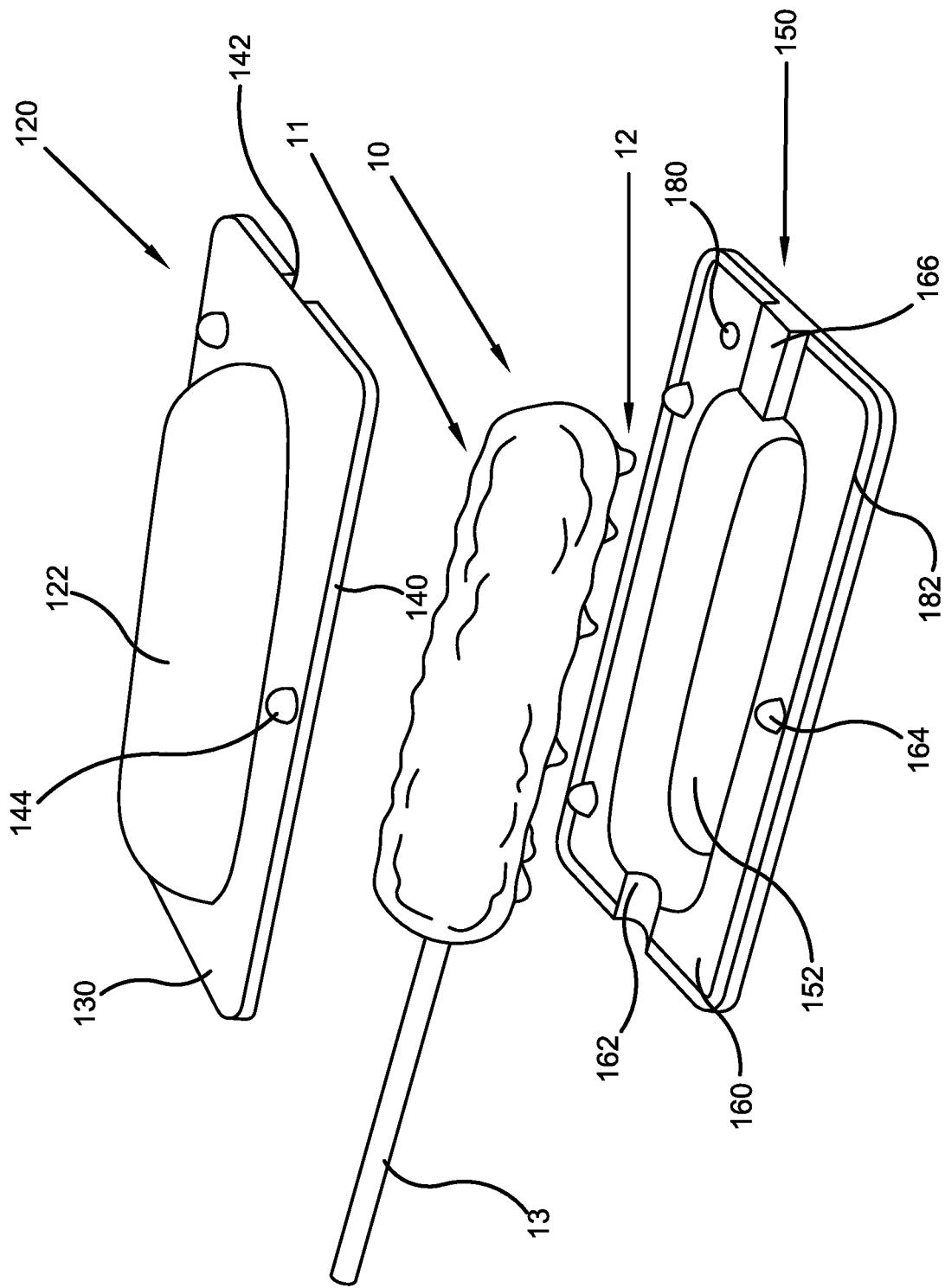
FIG. 1 illustrates an exploded view of one potential embodiment of a corn dog mold device of the present invention in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that allows a user to make a corn dog in an easy and convenient manner. There also exists a long-felt need in the art for a corn dog mold device that allows a user to make a corn dog without the traditional mess associated with making a corn dog that is caused by the batter of the corn dog spilling onto nearby surfaces and the user. Further, there exists a long-felt need in the art for a corn dog mold device that is reusable, easy to clean, simple to use and easy to manufacture.

The present invention, in one exemplary embodiment, is comprised of a corn dog mold device comprised of a body with an upper half and lower half that enclose a corn dog. In the preferred embodiment the body is manufactured from a silicone-type rubber material that may be flexible, semi-rigid or rigid. However, the body may also be manufactured from a flexible, semi-rigid or rigid plastic. Any surface of the body may have a plurality of indicia such as, but not limited to, patterns, logos, emblems, images, symbols, designs, letters, words, characters, animals, advertisements, brands, etc., and may also be any color known in the art.

The upper half of the body has a generally convex area on the top surface of the upper half. Said convex area receives the upper portion of a corn dog. The bottom surface of the upper half further has a plurality of generally triangular or generally cylindrical convex protrusions that protrusions extend from the bottom surface and through and above the top surface of the upper half. In addition, the bottom surface of said half is further comprised of a generally rectangular channel and a semi-circular opening.

The lower half of the body has a generally concave area that extends inward from the top surface of the lower half towards the bottom surface of the lower half, wherein the concave area receives the lower portion of a corn dog. The top surface of the lower half further has a plurality of generally triangular or generally cylindrical convex protrusions that extend from the top surface of the lower half, wherein the protrusions are received by the protrusions of the upper half, such that the lower half can be secured to the upper half in a removable snap fashion after a corn dog has been inserted into both halves.

In numerous embodiments, the bottom surface of the upper half and top surface of the lower half may be comprised of at least one fastener that allows each half to attach to one another. The bottom surface of the upper half and the top surface of the lower half may further be comprised of a rubber gasket that prevents corn dog batter from leaking out of the sides of each half after each half has been attached to one another.

A method of using the device to prepare a corn dog first involves battering a corn dog, which can occur with the corn dog outside of the device or with the corn dog resting in one half of the device. Then, both halves can be secured to each other with the battered corn dog within the device. Next, the device can be placed within a freezer for 3 to 5 minutes to allow the shape of the battered corn dog to settle before cooking. After 3-5 minutes, the corn dog can be removed from the device and then fried. Then, the device can be cleaned using warm water and soap and can be reused as necessary.

Accordingly, the corn dog mold device of the present invention is particularly advantageous as it allows a user to make a corn dog in an easy and convenient manner without the traditional mess associated with making a corn dog. Further, the device is reusable, easy to clean, simple to use and easy to manufacture. In this manner, the corn dog mold device overcomes the limitations of existing methods of making corn dogs known in the art.

Referring initially to the drawings, FIG. 1 illustrates an exploded view of one potential embodiment of a corn dog mold device 100 of the present invention in accordance with the disclosed architecture. The device 100 is comprised of a body 110 comprised of an upper half 120 and lower half 150, where both halves 120,150 enclose a corn dog 10. In the preferred embodiment the body 110 is manufactured from a silicone-type rubber material that may be flexible, semi-rigid or rigid in differing embodiments. Said rubber material may also include materials such as, but not limited to, neoprene, nitrile, EPDM, Styrene-Butadiene, Butyl, natural, fluorosilicone, etc. In one embodiment, the body 110 may be manufactured from a flexible, semi-rigid or rigid plastic such as, but not limited to, an acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, recycled plastic, biodegradable plastic, etc. In one embodiment, the material use for 110 is non-stick. Further, any surface of the body 110 may have a plurality of indicia such as, but not limited to, patterns, logos, emblems, images, symbols, designs, letters, words, characters, animals, advertisements, brands, etc. The body 110 may also be any color known in the art and may be transparent, semi-transparent or opaque.

The upper half 120 of the body 110 has a generally convex area 122 on the top surface 130, wherein the upper half 120 receives the upper portion 11 of a corn dog 10. The bottom surface 140 of the upper half 120 further has a plurality of generally triangular or generally cylindrical convex protrusions 144 that extend away from the bottom surface 140 and through and above the top surface 130. The bottom surface 140 is further comprised of a generally rectangular channel 142 and a semi-circular opening 146.

The lower half 150 of the body 110 has a generally concave area 152 that extends inward from the top surface 160 towards the bottom surface 170. The concave area 152 receives the lower portion 12 of a corn dog 10. The top surface 160 of the lower half 150 further has a plurality of generally triangular or generally cylindrical convex protrusions 166 that extend away from the top surface 160 and which are received by the protrusions 144 of the upper half 120. In this manner, the lower half 150 can be secured to the upper half 120 in a removable snap fashion after a corn dog 10 has been inserted into each half 120,150.

Figure 2:
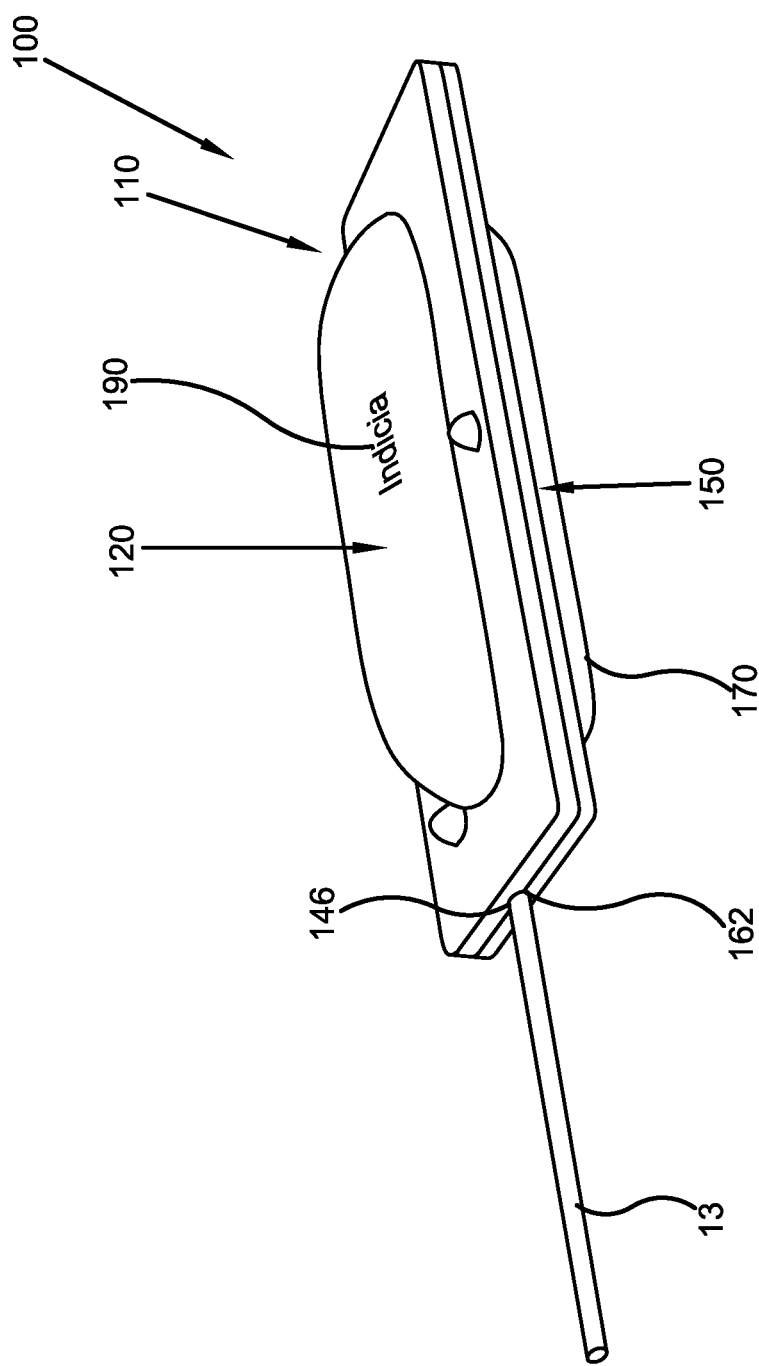
FIG. 2 illustrates a perspective view of one potential embodiment of a corn dog mold device of the present invention while a corn dog is inside the device in accordance with the disclosed architecture.

In one embodiment, the bottom surface 140 of the upper half 120 and top surface 160 of the lower half 150 may be comprised of at least one fastener 180 such as, but not limited to, hook and loop fasteners, magnets, snap-button, screws, adhesives, etc. The top surface 160 is further comprised of a generally rectangular protrusion 166 that is received by the channel 142 of the upper half 120 to further secure the halves 120,150 to one another in a tongue and groove-like fashion. The top surface 160 is further comprised of a semi-circular opening 162 that forms a generally circular opening with the opening 146 of the upper half 120 (when both halves 120, 150 are connected) through which a stem 13 of a corn dog 10 can extend through such that the stem 13 is not within either half 120, 150 (e.g. the stem 13 extends outwards away from the device 100), as seen in FIG. 2.

In one embodiment, the bottom surface 140 of the upper half 120 and the top surface 160 of the lower half 150 may further be comprised of a rubber gasket 182. The gasket 182 may be removably or fixedly attached to each surface 140,160 via at least one fastener 180. The gasket 182 prevents corn dog 10 batter from leaking out of the sides of each half 120,150 and each opening 146,162 after each half 120,150 has been attached to one another during use.

Figure 3:
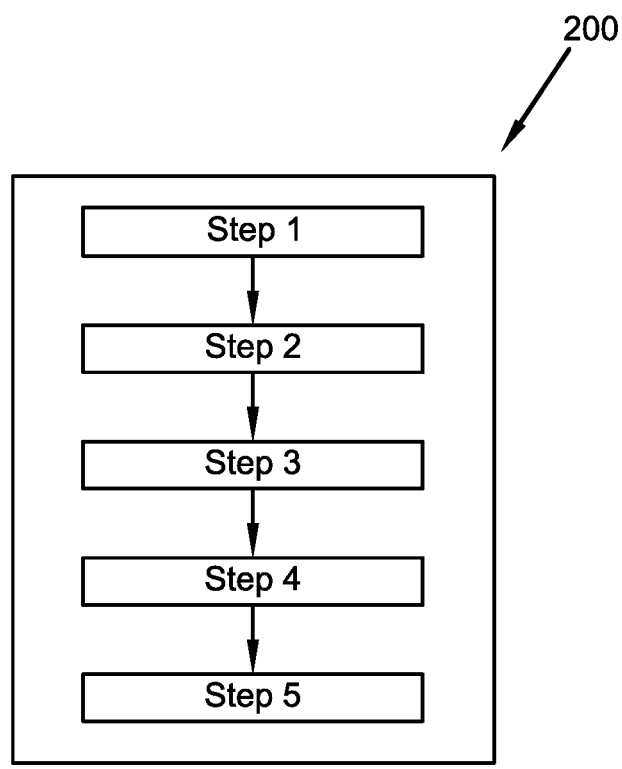
FIG. 3 illustrates a flow chart of one potential method of using one potential embodiment of a corn dog mold device of the present invention in accordance with the disclosed architecture.

FIG. 3 illustrates one potential method 200 of using one potential embodiment of a corn dog mold device 100 of the present invention in accordance with the disclosed architecture. The device 100 may also be comprised of a method 200 of using the device 100 to prepare a corn dog 10. First, a corn dog 10 is battered, which can occur with the corn dog 10 outside of the device 100 or with the corn dog 10 resting in one half 120,150 of the device 100 [Block 202]. Then, both halves 120,150 can be secured to each other with the battered corn dog 10 within the device 100 [Block 204]. Next, the device 100 can be placed within a freezer for 3 to 5 minutes to allow the shape of the battered corn dog 10 to settle before cooking [Block 206]. After 3-5 minutes, the corn dog 10 can be removed from the device 100 and then fried as normal [Block 208]. Then, the device 100 can be cleaned using warm water and soap and can be reused as necessary [Block 210].

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "corn dog mold device" and "device" are interchangeable and refer to the corn dog mold device 100 of the present invention.

Notwithstanding the forgoing, the corn dog mold device 100 of the present invention and its various components can be of any suitable size and configuration as is known in the art without affecting the overall concept of the invention, provided that they accomplish the above-stated objectives. One of ordinary skill in the art will appreciate that the size, configuration and material of the corn dog mold device 100 as shown in the FIGS. are for illustrative purposes only, and that many other sizes and shapes of the corn dog mold device 100 are well within the scope of the present disclosure. Although the dimensions of the corn dog mold device 100 are important design parameters for user convenience, the corn dog mold device 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A corn dog mold device comprising:
an upper half comprised of a convex area, a top surface having a plurality of convex protrusions that extend outwardly from the top surface, a bottom surface having a rectangular channel, and a semi-circular opening; and
a lower half comprised of a concave area, a top surface having a plurality of convex protrusions that outwardly from the top surface, a rectangular protrusion, and a semi-circular opening.

2. The corn dog mold device of claim 1, wherein each of the upper half and the lower half is manufactured from a silicone rubber.

3. The corn dog mold device of claim 2, wherein the silicone rubber is semi-rigid.

4. The corn dog mold device of claim 3, wherein the silicone rubber is non-stick.

5. The corn dog mold device of claim 2, wherein the plurality of convex protrusions of the lower half are received by the plurality of convex protrusions of the upper half such that the lower half can be secured to the upper half.

6. The corn dog mold device of claim 5, wherein the rectangular protrusion of the lower half engages the rectangular channel of the upper half to secure the upper half to the lower half.

7. The corn dog mold device of claim 6, wherein the semi-circular opening of the upper half and the semi-circular opening of the bottom half form a generally circular opening when the upper half is secured to the lower half.

8. The corn dog mold device of claim 1, wherein each of the upper half and the lower half further comprise a gasket.

9. The corn dog mold device of claim 8, wherein the gaskets are removably attached to each of the upper half and the lower half.

* * * * *